United States Patent
Ankersson et al.

(10) Patent No.: US 6,299,209 B1
(45) Date of Patent: Oct. 9, 2001

(54) PROTECTIVE DEVICE FOR MOTOR VEHICLE OCCUPANTS

(75) Inventors: Jim Ankersson, Fagersanna; Bengt Sätterman, Mullsiö, both of (SE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/415,686

(22) Filed: Oct. 8, 1999

Related U.S. Application Data

(63) Continuation of application No. PCT/SE98/00636, filed on Apr. 7, 1998, now abandoned.

(30) Foreign Application Priority Data

Apr. 9, 1997 (SE) .................................................. 9701288

(51) Int. Cl.⁷ .......................... B60R 21/045; B60R 21/20; B60R 21/22
(52) U.S. Cl. ...................... 280/753; 280/752; 280/730.1; 280/728.3; 280/732; 296/70
(58) Field of Search .............. 280/730.1, 728.1, 280/728.3, 753, 752, 751, 732; 296/70, 39.1

(56) References Cited

U.S. PATENT DOCUMENTS

| | | | |
|---|---|---|---|
| 2,070,760 | * 2/1937 | Staith | 280/752 |
| 3,951,427 | * 4/1976 | Wilfert | 280/732 |
| 5,035,444 | 7/1991 | Carter . | |
| 5,362,097 | * 11/1994 | Barske | 280/730.1 |
| 5,382,051 | 1/1995 | Glance . | |
| 5,447,326 | * 9/1995 | Laske et al. | 280/728.3 |
| 5,458,366 | * 10/1995 | Hock et al. | 280/753 |
| 5,536,043 | 7/1996 | Lang et al. . | |
| 5,544,913 | 8/1996 | Yamanishi et al. . | |
| 5,816,613 | * 10/1998 | Specht et al. | 280/753 |
| 5,839,756 | * 11/1998 | Schenck et al. | 280/732 |
| 5,868,422 | * 2/1999 | Galbraith et al. | 280/732 |
| 5,895,069 | 4/1999 | Heilig et al. . | |
| 6,050,595 | * 4/2000 | Knox | 280/728.3 |

FOREIGN PATENT DOCUMENTS

| | | |
|---|---|---|
| 42 09 604 | 10/1992 | (DE) . |
| 42 17 176 | 11/1993 | (DE) . |
| 43 30 692 | 3/1995 | (DE) . |
| 684164 | 11/1995 | (EP) . |
| 820905 | 1/1998 | (EP) . |
| 2267065 | 11/1993 | (GB) . |

* cited by examiner

Primary Examiner—Peter English
Assistant Examiner—Ruth Ilan
(74) Attorney, Agent, or Firm—MacMillan, Sobanski & Todd, LLC

(57) ABSTRACT

The present invention relates to a protective device, preferably an airbag device, disposed in a panel of a vehicle, and preferably to a knee airbag housed in the vehicle instrument panel. The invention comprises an expanding protective device which is secured in an interior panel (1) or part of said panel in vehicle compartments, said device comprising an expansion means (5) housed behind an opening in said panel, and a surface cover (3) secured in front of said opening. The surface cover has a larger extension than said opening and is also secured to the surrounding panel. In addition, the surface cover (3) is adapted to cover substantially the whole of the expansion means (5) towards the compartment space, also in the expanded condition of said means.

12 Claims, 4 Drawing Sheets

PROTECTIVE DEVICE FOR MOTOR VEHICLE OCCUPANTS

CROSS REFERENCE TO RELATED APPLICATIONS

This application is a continuation of International Application No. PCT/SE98/00636 filed Apr. 7, 1998 now abandoned which claims prioripy to Swedish Patent Application No. 9701288-4 filed Apr. 9, 1997.

TECHNICAL FIELD

The present invention relates to a protective device, primarily to an airbag device, which is arranged in the vehicle panel, and especially to a knee airbag housed in the vehicle instrument panel.

BACKGROUND

It is often desirable to equip motor vehicles with protective devices as a supplement to or as a replacement of safety belts. For example, it is already known to arrange knee protective devices in the vehicle instrument panel in combination with airbags for the driver as well as for the passengers. The knee protective device may be constructed so as to comprise energy absorbing material which is placed behind or which forms an integral part of the instrument panel. This type of knee protective device is, however, conditioned on the existence of a comparatively large zone of deformation behind the instrument panel, a feature which it may be difficult to obtain in small and compact cars. For this reason it is desirable that the energy absorption is initiated already before the knees reach the instrument panel.

This goal may be achieved by means of active knee protective systems wherein a required deformation path is created by a load-absorbing plate which is rapidly propelled against the knees through the deployment of an airbag, whereupon the kinetic energy of the knees in the forwards direction is decelerated (absorbed) by the return movement of the plate as the airbag deflates.

One kind of airbag of this type, devised for being housed in a vehicle instrument panel, is disclosed in EP 0 684 164 A1. This airbag device comprises a panel door which is removable in its entirety from the rest of the surrounding panel. An airbag module comprising an airbag and a gas generator is positioned behind the panel door. As a result of the activation of the airbag and the subsequent deployment thereof, the panel door is urged outwards, away from the rest of the panel, into contact with the knee of the vehicle occupant. One problem found in this type of airbag arrangements is, however, the gap formed in the joint between the panel door and the surrounding panel, which detracts from the aesthetic appearance of the vehicle interior.

U.S. Pat. No. 5,035,444 describes a similar airbag device the panel door of which is pivotally attached to the surrounding panel along part of its circumference. Owing to this arrangement the panel door will be pivoted upwards as the airbag behind is inflated. In order to hide the joint between the panel door and the surrounding panel the publication suggests the provision of a surface cover on the panel. The surface cover is adapted burst or rip open as the panel door pivots upwards, to allow expansion of the airbag. However, also this latter type of airbag device causes problems in that the airbag, when deployed, is exposed to the vehicle occupant, resulting in dust and other particles entering into the vehicle compartment and being given considerable kinetic energy owing to the very rapid expansion of the airbag. In addition, these airborne moving particles are a potential source of danger as they may cause personal injuries.

OBJECT OF THE INVENTION

It is therefore an object of the present invention to provide an active, expanding protective device which is formed integrally with a vehicle instrument panel or part thereof and by means of which the above outlined drawbacks inherent in the prior-art devices are eliminated.

DESCRIPTION OF THE PREFERRED EMBODIMENTS

For exemplifying purposes the invention will be described below in greater detail by means of one embodiment thereof and with reference to the accompanying drawings.

Figure 1:
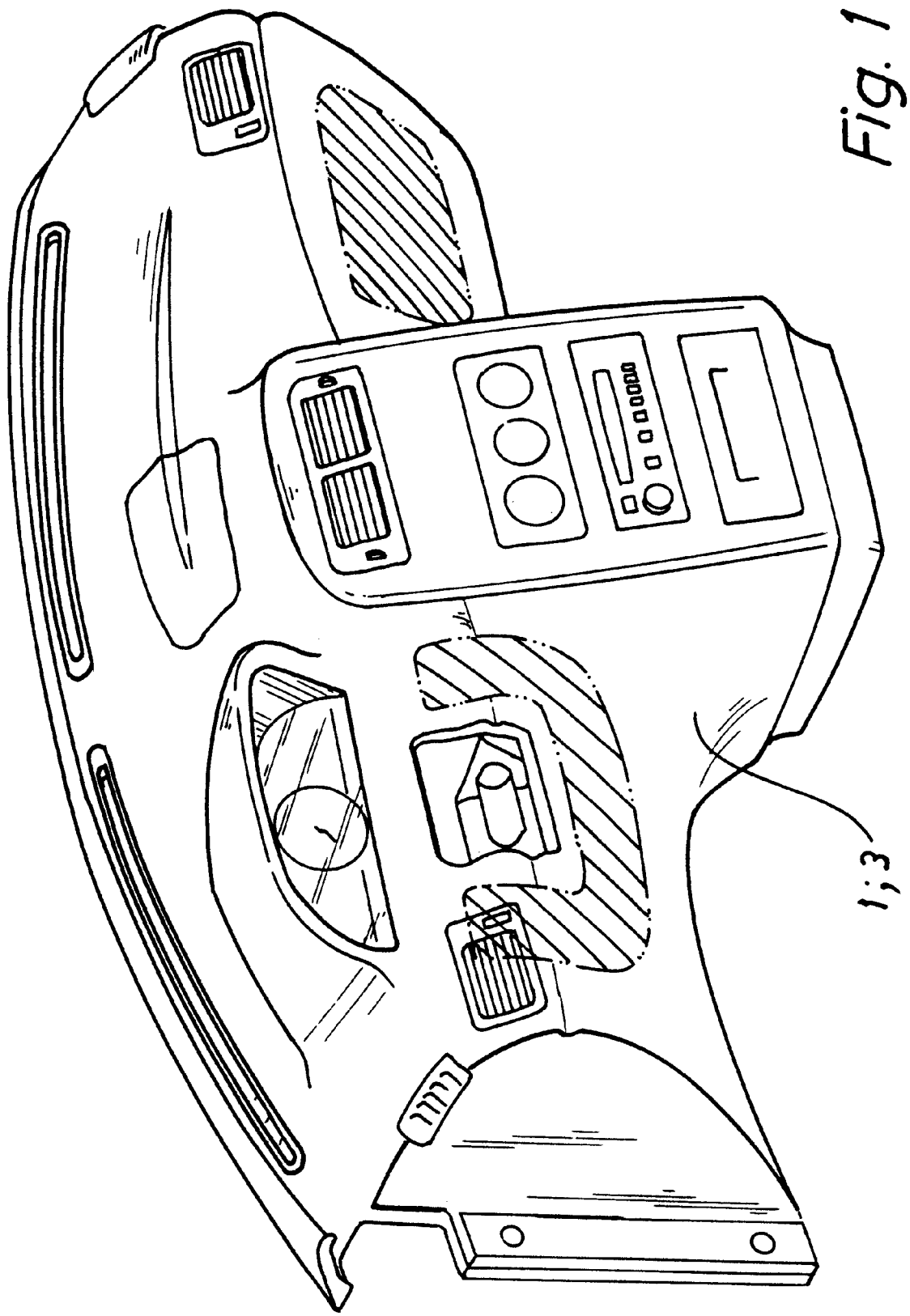
FIG. 1 is a view of an instrument panel, the hatched sections indicating the knee protection areas.
Figure 2:
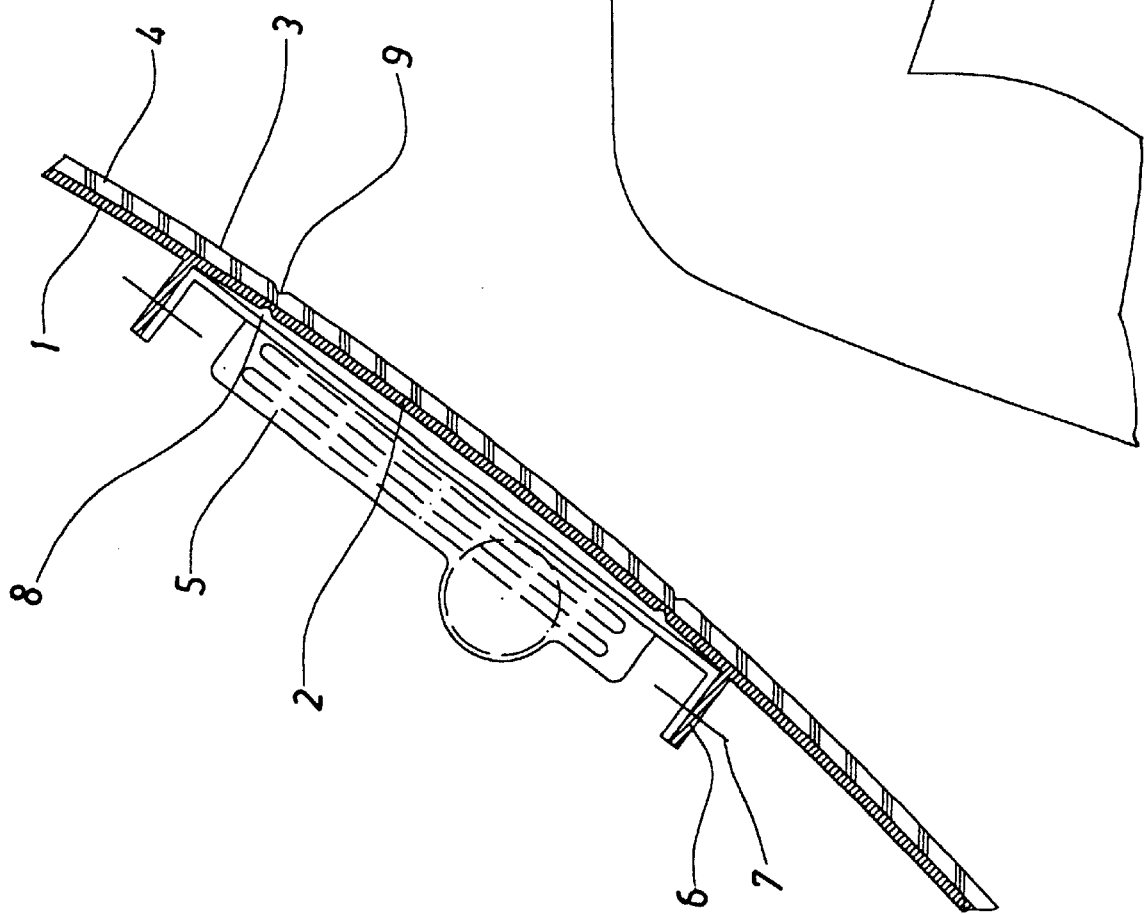
FIG. 2 is a cross-sectional view through a protective device in accordance with the invention in a non-activated position.

In FIG. 1 hatched sections indicate possible positions, in a conventional instrument panel 1, of the knee FIG. 2 illustrates a protective device which is integrally attached to an instrument panel 1, the latter in this case functioning as a carrier. The protective device comprises a panel door 2 which is formed integrally with the surrounding panel around its circumference but which is provided with a weakened area 8 adjacent the joint. A surface cover 3 is applied on top of the panel door/load distributor 2, said cover extending not only across the panel door but also across at least a portion of the surrounding instrument panel. Optionally, a soft layer (not shown) of e.g. foamed PUR (polyurethane) may be sandwiched between the surface cover 3 and the face of the panel. In addition, design grooves 9 may be formed in the panel.

Behind the panel door is housed a conventional air-bag module 5 comprising a holder made from plastics or sheet metal, a gas generator, and a folded airbag received in said holder. The airbag module 5 may be secured to the rear face of the instrument panel by means of separate or integrated angle brackets 6 which are secured in projecting attachment flanges 7 in the instrument panel by means of snap-in or screw fasteners.

Figure 3:
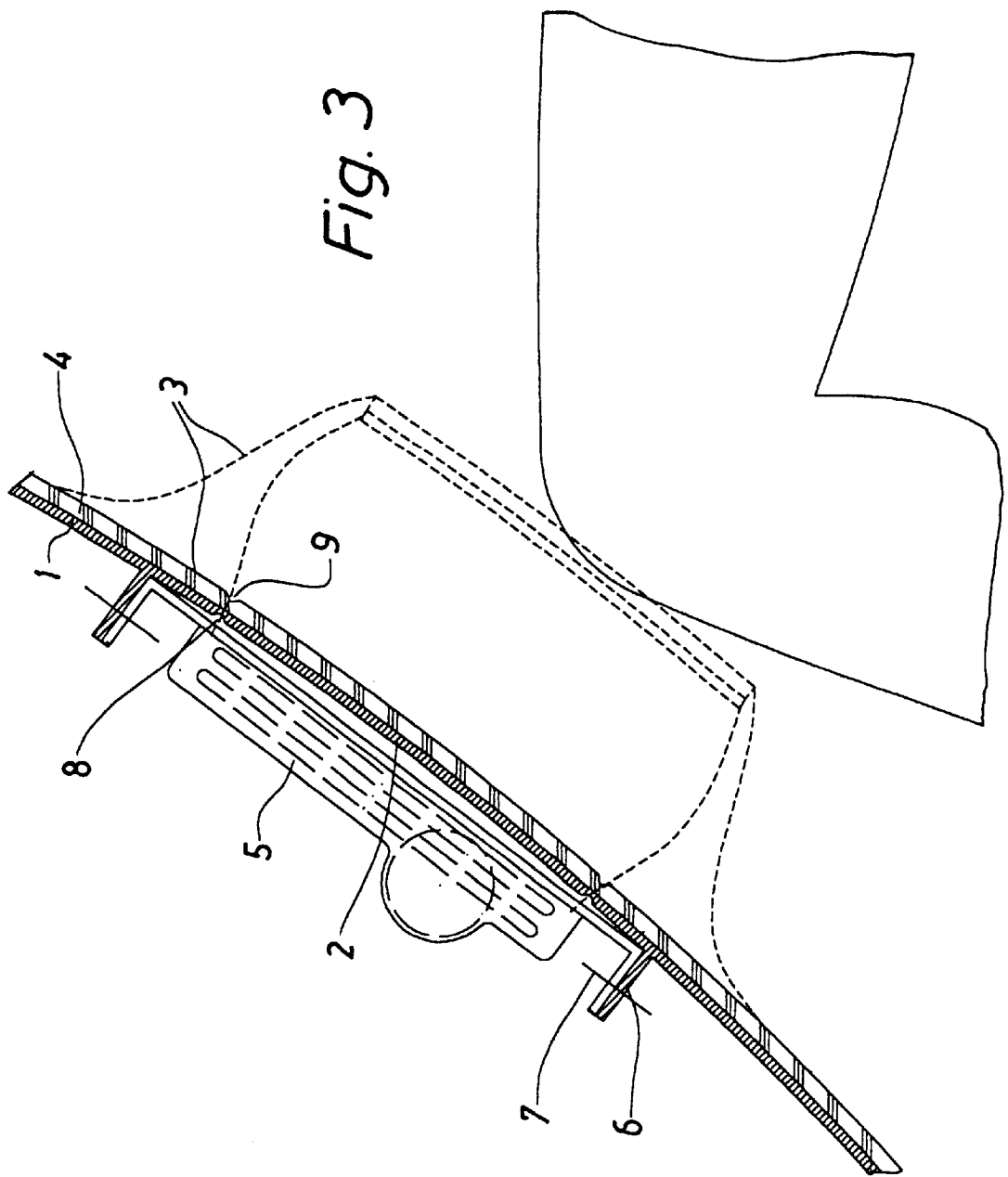
FIG. 3 is a cross-sectional view through the protective device of FIG. 1, wherein the active position is indicated by dashed lines.

Activation of the protective device causes the airbag to expand and in doing so it forces the panel door against the knees of the occupant, thereafter decelerating their movement forwards, towards the instrument panel. The protective device is illustrated in such an activated position in FIG. 3. Advantageously, the airbag is secured to the panel door. As an alternative, tether belts may be provided, to catch the air bag and restrain the expansion thereof, and to catch the panel door in order to prevent it from coming loose and forming a projectile when the airbag is being inflated.

The surface cover 3 in accordance with the invention is adapted not to burst but to merely stretch as the panel door is being forced outwards. In this manner the surface cover will extend over essentially the entire joint between the panel door and the surrounding panel, also after inflation and deployment of the airbag, thus preventing the airbag from being exposed directly to the compartment. Particles, such as dust, broken off pieces of the instrument panel or similar objects therefore are prevented from being ejected into the compartment during the very rapid expansion of the airbag.

Advantageously, a thermoplastic foil having a high rupture strength, such as so called TPO foil (Thermo Plastic Olefin) may be used.

Figure 4:
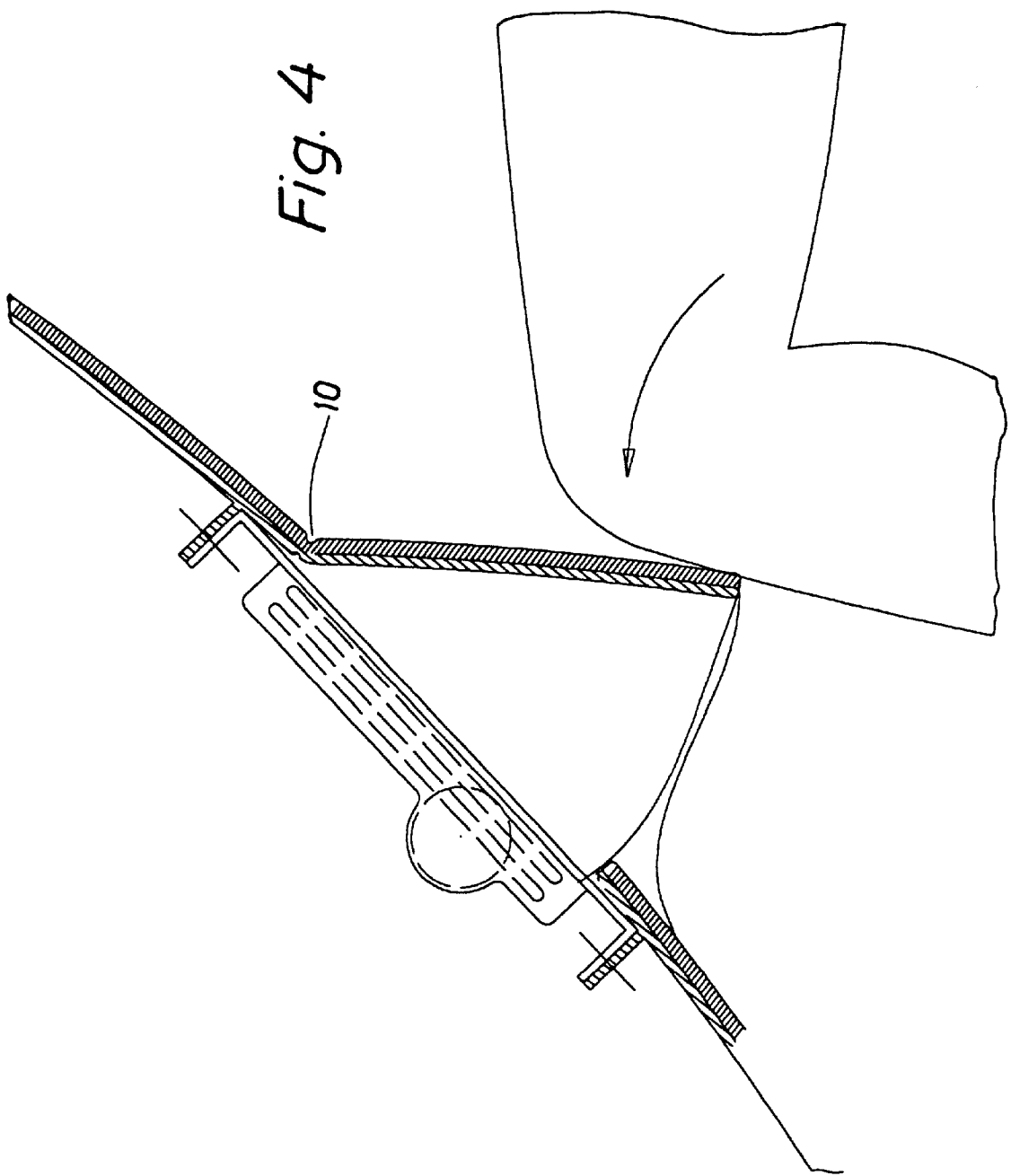
FIG. 4 is a view of an alternative embodiment of a protective device in accordance with the invention, the device being shown in an active position.

FIG. 4 illustrates an alternative embodiment of the protective device in accordance with the invention. In this embodiment the panel door is formed with a pivot attachment 10 by means of which it is joined to the surrounding panel, allowing the door-to be pivoted upwards when the airbag is activated.

A protective device in accordance with the invention could be arranged e.g. on the external face of the glove compartment door.

The invention has been described above by means of one embodiment. Several modifications are, however, possible. For example, other panel surfaces in the compartment than those of the instrument panel may be used to house the protective device, such as e.g. door panels that may come into contact with the vehicle occupants. In addition, the protective device need not have reference to knee protection and therefore be situated at knee level but could be placed at other levels and in other places that may involve contact between the vehicle and its occupants. It is further possible to eliminate the panel door entirely, leaving the airbag module to be covered solely by the surface cover and, as the case may be, by the PUR layer. It is likewise conceivable to use other types of expanding means than airbags. For example, expanding devices made from cloth, plastics or steel, may be used as may also pneumatic or hydraulic devices. Such equivalent varieties must be regarded to be within the scope of the present invention, such as the latter is defined in the appended claims.

What is claimed is:

1. An expanding protective apparatus for a vehicle comprising:

an expansion device mounted in the vehicle and operable to an expanded condition;

a panel defining an opening through which said expansion device extends when in the expanded condition;

a door panel disposed in said opening of said panel; and a cover secured in front of said opening of said panel and said door panel, wherein said cover is adapted to cover said opening and substantially the whole of the expansion device when in the expanded condition.

2. The apparatus of claim 1, wherein said door panel is integrally formed in said panel.

3. The apparatus of claim 2, wherein said door panel has a first portion connected to said panel, and wherein said door panel has a second portion separated from said panel.

4. The apparatus of claim 2, wherein said door panel is integrally formed in said panel by a weakened area about a portion of the circumference of said door panel.

5. The apparatus of claim 2, wherein said door panel is integrally formed in said panel by a weakened area about the entire circumference of said door panel.

6. The apparatus of claim 2, wherein said door panel is integrally formed in said panel about a circumference of said door panel, and wherein a portion of said door panel about said circumference is a pivot attachment permitting the door panel to pivot when said expansion device expands to the expanded condition.

7. The apparatus of claim 1, wherein said cover is made from a resiliently tensile material.

8. The apparatus of claim 1, wherein said expansion device is an air bag.

9. The apparatus of claim 1, wherein said panel is an instrument panel of a vehicle.

10. The apparatus of claim 9, wherein said expansion device is located at knee level in said instrument panel.

11. An expanding protective apparatus for a vehicle comprising:

an expansion device mounted in the vehicle and operable to an expanded condition;

a panel defining an opening through which said expansion device extends when in the expanded condition;

a door panel integrally formed in said panel and disposed in said opening, said door panel being integrally formed in said panel by a weakened area about a portion of the circumference of said door panel; and a cover secured in front of said opening of said panel and said door panel, said cover being made from a resiliently tensile material, wherein said cover is adapted to cover said opening and substantially the whole of the expansion device when in the expanded condition by stretching as said door panel is moved when said expansion device expands to the expanded condition.

12. The apparatus of claim 11, wherein said door panel is integrally formed in said panel about a circumference of said door panel, and wherein a portion of said door panel about said circumference is a pivot attachment permitting the door panel to pivot when said expansion device expands to the expanded condition.

* * * * *